(12) United States Patent
Hayashi et al.

(10) Patent No.: US 9,463,420 B2
(45) Date of Patent: *Oct. 11, 2016

(54) MANUFACTURING METHODS FOR A POROUS FLUORORESIN COMPOSITE

(71) Applicant: SUMITOMO ELECTRIC FINE POLYMER, INC., Sennan-gun, Osaka (JP)

(72) Inventors: Fumihiro Hayashi, Osaka (JP); Itsumu Furumoto, Osaka (JP); Shinichi Kanazawa, Osaka (JP); Kazuaki Ikeda, Osaka (JP); Tooru Morita, Osaka (JP); Hajime Funatsu, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/541,905

(22) Filed: Nov. 14, 2014

(65) Prior Publication Data

US 2015/0069675 A1 Mar. 12, 2015

Related U.S. Application Data

(62) Division of application No. 12/376,545, filed as application No. PCT/JP2007/065339 on Aug. 6, 2007, now abandoned.

(30) Foreign Application Priority Data

Aug. 9, 2006 (JP) .................. 2006-217498
May 1, 2007 (JP) .................. 2007-121222

(51) Int. Cl.
*B01D 67/00* (2006.01)
*B32B 15/16* (2006.01)
(Continued)

(52) U.S. Cl.
CPC ........... *B01D 67/0004* (2013.01); *B01D 63/06* (2013.01); *B01D 67/0027* (2013.01);
(Continued)

(58) Field of Classification Search
CPC .......... B01D 67/0004; B01D 67/0027; B01D 71/36; B32B 15/16
See application file for complete search history.

(56) References Cited

U.S. PATENT DOCUMENTS 3,297,484 A 1/1967 Niedrach
4,340,384 A 7/1982 Nomi
(Continued)

FOREIGN PATENT DOCUMENTS

CN 1180364 A 4/1998
CN 1537150 A 10/2004
(Continued)

OTHER PUBLICATIONS

Notification of Second Office Action from SIPO dated Mar. 7, 2012 (3 pages) and its English-language translation (4 pages).
(Continued)

*Primary Examiner* — Nicole M Buie-Hatcher
(74) *Attorney, Agent, or Firm* — Drinker Biddle & Reath LLP

(57) ABSTRACT

There are provided a fluororesin thin film which is composed of a fluororesin, which has a thickness of 20 μm or less and a Gurley's number of 300 seconds or more, and which includes no defects, such as voids and/or cracks; a method for manufacturing the fluororesin thin film in which after a fluororesin dispersion including a dispersing medium and a fluororesin powder dispersed therein is applied on a flat and smooth foil, the dispersing medium is dried, and the fluororesin powder is sintered; the fluororesin dispersion; a fluororesin composite including a porous base material and the fluororesin thin film; a manufacturing method thereof, a porous fluororesin composite formed by stretching the fluororesin composite; and a separation membrane element using the porous fluororesin composite.

4 Claims, 5 Drawing Sheets

(51) Int. Cl.
  *B01D 63/06* (2006.01)
  *B01D 69/12* (2006.01)
  *B01D 71/32* (2006.01)
  *B01D 71/34* (2006.01)
  *B01D 71/36* (2006.01)
  *B32B 15/08* (2006.01)
  *C08J 5/18* (2006.01)
  *B32B 7/12* (2006.01)
  *B32B 15/20* (2006.01)
  *B32B 27/32* (2006.01)
  *B32B 1/08* (2006.01)

(52) U.S. Cl.
  CPC ............. *B01D69/12* (2013.01); *B01D 71/32* (2013.01); *B01D 71/34* (2013.01); *B01D 71/36* (2013.01); *B32B 1/08* (2013.01); *B32B 7/12* (2013.01); *B32B 15/08* (2013.01); *B32B 15/16* (2013.01); *B32B 15/20* (2013.01); *B32B 27/322* (2013.01); *C08J 5/18* (2013.01); *B01D 2323/26* (2013.01); *B01D 2325/04* (2013.01); *B32B 2255/06* (2013.01); *B32B 2255/26* (2013.01); *B32B 2264/0257* (2013.01); *B32B 2307/202* (2013.01); *B32B 2307/54* (2013.01); *B32B 2307/704* (2013.01); *B32B 2307/726* (2013.01); *C08J 2327/12* (2013.01); *Y10T 428/249991* (2015.04)

(56) References Cited

U.S. PATENT DOCUMENTS

| | | | |
|---|---|---|---|
| 5,143,783 | A | 9/1992 | Shimizu et al. |
| 5,286,568 | A * | 2/1994 | Bacino ................. C09D 127/12 428/318.6 |
| 5,510,176 | A | 4/1996 | Nakamura et al. |
| 5,968,642 | A | 10/1999 | Saito |
| 6,019,920 | A | 2/2000 | Clough |
| 6,046,271 | A | 4/2000 | Wu et al. |
| 6,143,675 | A * | 11/2000 | McCollam ................ B32B 5/32 156/77 |
| RE37,701 | E | 5/2002 | Bahar et al. |
| 6,613,203 | B1 * | 9/2003 | Hobson ................ B01D 69/141 204/296 |
| 6,746,587 | B2 | 6/2004 | Saffell et al. |
| 2003/0211264 | A1 * | 11/2003 | Farnsworth ............... B32B 5/18 428/36.9 |
| 2004/0099527 | A1 * | 5/2004 | Nakayama .............. C08L 27/12 204/296 |
| 2004/0195173 | A1 | 10/2004 | Huang et al. |
| 2005/0096425 | A1 | 5/2005 | Coates et al. |
| 2006/0233990 | A1 | 10/2006 | Humphrey et al. |
| 2006/0269735 | A1 * | 11/2006 | Wang ..................... B01D 69/12 428/316.6 |
| 2009/0202876 | A1 | 8/2009 | Shimamura et al. |
| 2010/0320142 | A1 | 12/2010 | Ge et al. |

FOREIGN PATENT DOCUMENTS

| | | |
|---|---|---|
| CN | 101003588 A | 7/2007 |
| CN | 101759832 A | 6/2010 |
| CN | 101775096 A | 7/2010 |
| CN | 101775097 A | 7/2010 |
| EP | 0 369 466 A2 | 5/1990 |
| EP | 1 652 663 A2 | 5/2006 |
| EP | 2 060 314 A1 | 5/2009 |
| EP | 2 239 044 A1 | 10/2010 |
| EP | 2 837 653 A1 | 2/2015 |
| JP | 53-55379 | 5/1978 |
| JP | 61-16840 | 1/1986 |
| JP | S61-66730 A | 4/1986 |
| JP | 5-32810 | 2/1993 |
| JP | H08-339809 A | 12/1996 |
| JP | 9-173438 | 7/1997 |
| JP | 9-278927 | 10/1997 |
| JP | 10-323923 | 12/1998 |
| JP | 10-512620 | 12/1998 |
| JP | 11-35716 | 2/1999 |
| JP | 11-501964 | 2/1999 |
| JP | H11-300180 A | 11/1999 |
| JP | 11-349887 A | 12/1999 |
| JP | 2002-177390 A | 6/2002 |
| JP | 2002-301321 A | 10/2002 |
| JP | 2003-128833 | 5/2003 |
| JP | 2005-520002 | 7/2005 |
| JP | 2006-142275 A | 6/2006 |
| JP | 2007-332342 A | 12/2007 |
| JP | 4371176 B2 | 11/2009 |
| JP | 2010-094579 A | 4/2010 |
| JP | 2010-132712 A | 6/2010 |
| JP | 2011-052175 A | 3/2011 |
| WO | WO 97/36953 A1 | 10/1997 |
| WO | WO 2006043363 A1 | 4/2006 |
| WO | WO 2007/026822 A1 | 3/2007 |
| WO | WO 2008/018400 A1 | 2/2008 |
| WO | WO 2011/152145 A1 | 12/2011 |

OTHER PUBLICATIONS

"Sinter", Merriam Webster, http://www.merriam-webster.com/dictionary/sinter, Aug. 6, 2012.
Extended European Search Report dated Apr. 9, 2013 issued in European Patent Application No. 13156468.4.
Machine translation of JP 05-032810 A, Oct. 17, 2013.
"PTFE, FEP, and PFA Specifications", Boedeker Plastics, Inc., 2016, 2 pages, Retrieved from http://www.boedeker.com/feppfa_p.htm on Mar. 24, 2016.

* cited by examiner

MANUFACTURING METHODS FOR A POROUS FLUORORESIN COMPOSITE

This is a divisional application of copending application Ser. No. 12/376,545, having a §371 date of Mar. 1, 2010, which is a national stage filing based on PCT International Application No. PCT/JP2007/065339 filed on Aug. 6, 2007. The copending application Ser. No. 12/376,545 is incorporated by reference herein in its entirety.

TECHNICAL FIELD

The present invention relates to a film composed of a fluororesin and having a thickness of 20 μm or less, that is, a fluororesin thin film, and to a method for manufacturing the same. The present invention also relates to a fluororesin dispersion which is suitably used for a method for manufacturing this fluororesin thin film. The present invention further relates to a fluororesin composite composed of a porous member and the above fluororesin thin film provided on a surface thereof and to a method for manufacturing the fluororesin composite. The present invention still further relates to a porous fluororesin composite formed by stretching this fluororesin composite and a separation membrane element which uses this porous fluororesin composite.

BACKGROUND ART

A film composed of a fluororesin, such as a polytetrafluoroethylene (PTFE), has features, such as superior chemical resistance and heat resistance, and for example, a fluororesin film processed to have pores therein is used as a filter which filters fine particles. When the fluororesin thin film is used as a filter, in order to achieve filtration and segregation of fine particles and to obtain superior filtration ability (filtering characteristics), the film is required to have a smaller thickness as well as minute and uniform pore diameters and a high porosity.

The fluororesin thin film processed to have pores therein can be obtained, for example, by stretching a resin film of PTFE. According to a method for stretching a non-porous fluororesin thin film, a porous fluororesin thin film having minute pore diameters can be manufactured.

Since PTFE has a high melt viscosity, a thin film cannot be formed by melt extrusion or the like. Accordingly, in general, there have been used a method in which a PTFE resin powder is mold into a cylindrical block, followed by shaving off the surface of the block, and a method in which a paste formed by mixing a PTFE resin powder and a liquid lubricant is molded by extrusion, followed by rolling or the like. However, since the methods described above are each a process by applying a mechanical load, when the film thickness is decreased, in particular, to 20 μm or less, due to an insufficient strength of the film against the mechanical load, the film may be stretched, wrinkled, bored, or broken in some cases; therefore, it has been very difficult to obtain a thin film having a thickness of approximately 20 μm or less.

As another method, there has been conceived a method (casting method) in which a dispersion composed of a liquid and a fluororesin powder dispersed therein is applied on a base material and is then heated to a melting point or more for sintering the fluororesin powder as well as for removing the liquid. For example, in Japanese Unexamined Patent Application Publication No. 5-32810 (Patent Document 1), a method for forming a thin film has been disclosed in which after a dispersion of PTFE powder particles is applied on a heat resistant substrate and is then heated to a melting temperature or more of PTFE to bind the powder particles to each other. The thin film thus formed is peeled away from the substrate and is then stretched, thereby forming a porous PTFE thin film.

DISCLOSURE OF INVENTION

Problems to be Solved by the Invention

However, since a fluororesin, in particular PTFE, has a high melt viscosity, the fluidity is low during sintering, binding and densification of resin particles applied on a base material are not likely to proceed, and gaps between the particles are not likely to be filled, so that micro-voids are liable to remain. As a result, as the applied resin thickness is decreased, a larger number of defects, such as micro-voids and/or cracks, are generated. In order to suppress the generation of defects, application must be repeatedly performed to obtain a thickness in the range of 20 to 30 μm, and as a result, a thin film having a thickness of 20 μm or less and a small number of defects could not be obtained.

A first object of the present invention is to provide a fluororesin thin film having a small thickness that could not be obtained in the past and having no defects, such as voids and/or cracks.

A second object of the present invention is to provide a method for manufacturing the fluororesin thin film described above.

A third object of the present invention is to provide a fluororesin dispersion which is used for a method for manufacturing the fluororesin thin film described above and which can realize manufacturing of a fluororesin thin film having a smaller number of defects.

A fourth object of the present invention is to provide a fluororesin composite which uses the fluororesin thin film described above and which has superior features, that is, superior mechanical strength, easy handling during processing such as stretching, and the like, and is to provide a method for manufacturing the fluororesin composite described above.

A fifth object of the present invention is to provide a porous fluororesin composite which is obtained from the fluororesin composite described above and which not only exhibits superior filtering characteristics but also shows superior mechanical strength and is to provide a separation membrane element using the above porous fluororesin composite.

Means for Solving the Problems

Through intensive research carried out by the inventor of the present invention, it was found that by a method in which a fluororesin dispersion applied on a base material is covered with a flat and smooth foil and is then sintered, even if the thickness is 20 μm or less or further 10 μm or less, a fluororesin thin film having no defects, such as voids and/or cracks, can be obtained; hence, based on this finding, the present invention was made.

According to a first aspect of the present invention, there is provided a fluororesin thin film comprising: a fluororesin, wherein the thickness of the fluororesin thin film is 20 μm or less and the Gurley's number thereof is 300 seconds or more (Claim 1).

Since having a thickness of 20 μm or less, when this thin film is processed to have pores therein and is used as a filter, a high processing speed can be obtained. The thickness of the thin film is preferably 10 μm or less, and in this case, a higher processing speed can be obtained.

Although when the fluororesin thin film of the present invention has a small thickness of 20 μm or less or further 10 μm or less, the number of defects, such as voids and/or cracks, is small. A Gurley's number of 300 seconds or more indicates that the number of defects is small.

The Gurley's number is a value indicating the permeability (permeation rate of air) described in JIS-P8117 and particularly indicates a time (seconds) required to allow 100 ml of air to pass through an area of 645 cm$^2$. When a thin film has defects, since air passes therethrough, the Gurley's number is decreased, and on the other hand, when as the number of defects is decreased, since air is not likely to pass through, the Gurley's number is increased.

As the fluororesin thin film of the present invention, the Gurley's number is preferably 1,000 seconds or more (Claim 2). A thin film having a Gurley's number of 1,000 seconds or more has a smaller number of defects, such as voids and/or cracks, and since the film thickness is 20 μm or less, a high processing speed as a filter can be obtained. In particular, when the Gurley's number is 5,000 seconds or more, the number of defects is further decreased, and hence it is more preferable.

However, when the defects of the thin film are very minute, they may not be sufficiently detected in some cases only by the measurement of the Gurley's number. The minute defects as described above can be confirmed by a method for measuring the permeability through a fluororesin film using a liquid, such as alcohol, ether, paraffin, or a fluorinated polyether, having a relatively low surface tension. For example, the presence of minute defects that may not be detected by the measurement of the Gurley's number can be detected by an IPA permeation test in which after IPA (isopropyl alcohol) is applied at normal temperature and pressure on a surface of a film which is horizontally placed, the presence of IPA which spontaneously passes through the film by the gravity and capillary phenomenon and reaches a bottom surface of the film is measured.

In particular, the IPA permeation test is performed such that 10 ml of IPA is uniformly applied using a brush on a film which has an area of 273 cm$^2$ and which is in direct contact with filter paper at the bottom surface thereof, and after 30 seconds elapses, the presence of IPA adsorption to the above filter paper is observed by the naked eye to detect the IPA permeation.

In accordance with one embodiment of the present invention disclosed in Claim 3, in the fluororesin thin film according to Claim 1 or 2, no IPA permeation is detected by an IPA permeation test performed at 25° C. This fluororesin film has a small number of minute defects that cannot be detected by the Gurley's number and is a more preferable fluororesin thin film.

In accordance with one embodiment of the present invention disclosed in Claim 4, in the fluororesin thin film according to one of Claims 1 to 3, the fluororesin is one selected from the group consisting of PTFE, tetrafluoroethylene-perfluoroalkyl vinyl ether copolymer (PFA), tetrafluoroethylene-hexafluoropropylene copolymer, polychlorotrifluoroethylene, tetrafluoroethylene-ethylene copolymer, chlorotrifluoroethylene-ethylene copolymer, polyvinylidene fluoride, and polyvinyl fluoride or is a mixture including at least two thereof. The fluororesin thin film composed of at least one of the fluororesins described above is preferable since it has features, such as superior chemical resistance and heat resistance.

Among those mentioned above, a fluororesin primarily composed of PTFE is preferable. Among the fluororesins, PTFE has particularly superior chemical resistance and heat resistance, and when PTFE is used as a primary component, a fluororesin thin film having particularly superior chemical resistance, heat resistance, and the like can be obtained. The primary component means that the content is at least 50 percent by weight. In addition, in fluororesins each primarily composed of PTFE, a resin composed only of PTFE is also included.

Among the fluororesins primarily composed of PTFE, a resin including a thermoplastic fluororesin and/or a nonionic water-soluble polymer, such as polyethylene oxide or polyvinyl alcohol, having a molecular weight of 10,000 or more is more preferable. Since those as described above have no influences on the dispersibility of a fluororesin dispersion and are gelled to form a film when moisture is dried, a fluororesin thin film having a smaller number of defects and a larger Gurley's number can be obtained.

As the thermoplastic fluororesin, a resin having a low surface tension when melted and a low melt viscosity is preferable since an effect of suppressing the generation of defects is significant. In particular, the melt flow rate is preferably 5 g/10 minutes or more, more preferably 10 g/10 minutes or more, and even more preferably 20 g/10 minute or more.

As the thermoplastic fluororesin to be used together with PTFE, in more particular, for example, PFA, tetrafluoroethylene-hexafluoropropylene copolymer (FEP), tetrafluoroethylene-hexafluoropropylene-perfluoroalkyl vinyl ether copolymer (EPA), and tetrafluoroethylene-ethylene copolymer (ETFE) may be mentioned. Among those mentioned above, PFA is preferable since it is most unlikely to be thermally decomposed at a melting point (327° C.) of PTFE or more. In particular, when the above thermoplastic fluororesin is PFA, and the volume ratio (solid component) thereof is less than 20% with respect to the volume of the mixture of PTFE and PFA, it is preferable since the number of defects is significantly decreased.

The fluororesin thin film of the present invention described above can be manufactured by a method in which after a fluororesin dispersion including a dispersing medium and a fluororesin powder dispersed therein is applied on a flat and smooth foil, the dispersing medium is dried, and the fluororesin is sintered, followed by removing the flat and smooth foil. As a second aspect of the present invention, there is provided a method for manufacturing this fluororesin thin film.

Through intensive research on a method for suppressing the generation of defects carried out by the inventor of the present invention, which was focused on the phenomenon in which when the dispersing medium is dried, defects, such as cracks, are generated by the surface tension thereof, it was found that when a nonporous film (flat and smooth foil) is closely in contact with an applied fluororesin dispersion so as to decrease a contact area thereof with air as small as possible, and drying and sintering are then performed, the generation of defects can be significantly suppressed; hence, the present invention was made.

In this manufacturing method, the flat and smooth foil is a flat and smooth film in which pores and/or irregularities are not observed on a surface of the film which is in contact with the fluororesin dispersion. Although the thickness of the flat and smooth foil is not particularly limited, the thickness thereof is preferably set so that the foil has flexibility to easily cover a fluororesin dispersion applied on a base material without generating air bubbles. In addition, when the flat and smooth foil is removed after the thin film is formed, the thickness of the foil is preferably set so that the flat and smooth foil is easily peeled away. For example, when the flat and smooth foil is removed by dissolution, the thickness thereof is preferably set so that the flat and smooth foil is easily removed by dissolution.

As the flat and smooth foil, a metal foil is preferably used since it has flexibility to cover the fluororesin dispersion without generating air bubbles therebetween and can be easily removed by dissolution using acid or the like after the thin film is formed. This is a preferable embodiment of the present invention. Among various metal foils, an aluminum foil is particularly preferable due to its flexibility, easy removal by dissolution, and easy availability.

In the manufacturing method of the present invention, a fluororesin dispersion including a fluororesin powder dispersed in a dispersing medium is first applied on the above flat and smooth foil. Although a method for applying a fluororesin is not particularly limited, for example, there may be mentioned a method for simply applying a fluororesin dispersion on a flat and smooth foil, and a method in which a porous base material is used, and a fluororesin dispersion is injected between this base material and a flat and smooth foil.

For the injection of a fluororesin dispersion between a base material and a flat and smooth foil, a method may be used in which after the fluororesin dispersion is applied on the base material, the flat and smooth foil may be provided on the fluororesin so as not to trap air bubbles therebetween. In addition, as a coating application device, for example, a capillary, a gravure, a roll, a die (lip), a slit, or a bar type coater may be used. In particular, in order to form a thin film, a capillary, a die, a slit, or a bar type coater is preferably used.

After the application, the dispersing medium is dried. The drying may be performed by heating to a temperature close to or higher than a boiling point of the dispersing medium. A film is formed from the fluororesin powder by drying, and when this film is heated to a melting point of the fluororesin or more, the fluororesin thin film of the present invention can be obtained. The heating for drying and the heating for sintering may be performed in the same step.

After the fluororesin thin film of the present invention is formed as described above, whenever necessary, the flat and smooth foil covering this thin film is removed. A removing method is not particularly limited; however, when the flat and smooth foil is a metal film, a method in which a foil is removed by dissolution using acid or the like may be mentioned by way of example.

On the other hand, without removing the flat and smooth foil, the fluororesin thin film may be used therewith. For example, in the case of a metal foil, the foil may not be removed or may be only partly removed to be used as a conductive plate or a circuit provided on the fluororesin thin film functioning as a substrate.

In accordance with a third aspect of the present invention, there is provided a fluororesin dispersion suitably used for the manufacturing method of the present invention described above.

The fluororesin dispersion is a dispersion composed of a fluororesin powder dispersed in a dispersing medium. As the dispersing medium, in general, an aqueous medium such as water is used. The fluororesin powder is an aggregate of fine fluororesin particles and may be obtained, for example, by emulsion polymerization. The content of the fluororesin powder in the fluororesin dispersion is preferably in the range of 20 to 70 percent by weight.

As the fluororesin dispersion described above, a fluororesin dispersion in which a fluororesin powder primarily composed of PTFE is dispersed in a dispersing medium is preferable. By using a fluororesin dispersion primarily composed of PTFE, a fluororesin thin film primarily composed of PTFE is obtained, and hence a fluororesin thin film having superior chemical resistance, heat resistance, and the like can be obtained.

As the fluororesin dispersion composed of a fluororesin powder primarily including PTFE, a fluororesin dispersion is preferably used in which a PTFE powder is a primary component and in which a mixture of this PTFE powder and the thermoplastic fluororesin powder as described above is dispersed in a dispersing medium. This is a preferable embodiment. Since the fluororesin dispersion including a thermoplastic fluororesin powder as well as including PTFE as a primary component is used, a fluororesin thin film having a smaller number of defects and a larger Gurley's number can be obtained. As a result, a fluororesin thin film can be obtained which has, for example, a superior effect of suppressing the permeation of gas, water steam, organic solvent, and the like at a high temperature.

If the content of the thermoplastic fluororesin in the mixture of the PTFE powder and the thermoplastic fluororesin powder is high, when a thin film is formed by applying a fluororesin dispersion on a surface of a porous member or the like containing air, the fluororesin dispersion is liable to be aggregated, for example, at a skeleton portion of the surface of the porous member due to the surface tension of the thermoplastic fluororesin, and hence defects are liable to be generated. Hence, as the content of the thermoplastic fluororesin, the volume ratio thereof is preferably less than 37% with respect to the total volume of a solid component of the mixture of the PTFE powder and the thermoplastic fluororesin powder. The volume ratio is more preferably less than 20% and is further preferably 10% or less.

Among those described above, a fluororesin dispersion in which PTFE is used as a primary component, a mixture of a PTFE powder and a thermoplastic fluororesin powder is dispersed in a dispersing medium, PFA is used as the thermoplastic fluororesin, and the volume ratio thereof is less than 20% with respect to the volume of the mixture is preferable since a fluororesin thin film having dense properties, a smaller number of defects, and a large Gurley's number can be obtained. This is a preferable embodiment.

The effect of reducing the number of defects, such as voids and/or cracks, may also be obtained by adding a water-soluble polymer, which is gelled under a high concentration condition, to a fluororesin powder primarily composed of PTFE. When the above thermoplastic fluororesin and this water-soluble polymer are both added, the above-described effect can be more significant.

When this water-soluble polymer is nonionic, the dispersibility of a fluororesin is not affected thereby or is only slightly affected. Hence, as the water-soluble polymer, a nonionic polymer is preferable as compared to an anionic and a cationic one. In addition, the molecular weight of this nonionic water-soluble polymer is preferably 10,000 or more. When the molecular weight is 10,000 or more, during drying is performed, a film is formed by gellation before water is completely removed, and hence the generation of cracks caused by the surface tension of water can be suppressed. This is a preferable embodiment and provides a fluororesin dispersion according to one of the arrangements discussed in foregoing paragraphs which contains a nonionic water-soluble polymer having a molecular weight of 10,000 or more. As the water-soluble polymer, for example, polyethylene oxide, polypropylene oxide, polyvinyl alcohol, starch, or agarose may be mentioned.

In addition, the content of the water-soluble polymer in the fluororesin dispersion is preferably in the range of 1 to 34 mg/ml. When the content is less than 1 mg/ml, the effect obtained by the addition of the water-soluble polymer may not be sufficiently obtained, and on the other hand, when the content is more than 34 mg/ml, the viscosity of the fluororesin dispersion is excessively increased, so that handling thereof may not be easily performed in some cases.

Depending on a method for applying a fluororesin, variation of the thickness of a flat and smooth foil, and deflection thereof, an application tool of an application coating device may directly come into contact with a surface of the foil to form scratches thereon, and the scratches may be transferred to the fluororesin thin film in some cases. Consequently, irregularities may be formed on the surface, and defects such as pinholes may be further formed in worse case. Accordingly, since the friction coefficient can be decreased when an anionic surfactant having a concentration of 0.5 mg/ml or more and preferably 2.5 mg/ml or more is added, the generation of defects, such as surface irregularities and/or pinholes, can be suppressed. In addition, the addition of an anionic surfactant is preferably 30 mg/ml or less and more preferably 10 mg/ml or less. When the amount of an anionic surfactant is more than this upper limit, problems in that the viscosity is excessively increased, resin is liable to be aggregated, and the like tend to occur. In addition, since decomposition residues remain, discoloration is also liable to occur. This is a preferred embodiment and provides a fluororesin dispersion according to one of arrangements discussed in forgeoing paragraphs which contains an anionic surfactant having a concentration of 0.5 to 30 mg/ml.

As the anionic surfactant, for example, a carboxylic acid type surfactant such as a polyoxyethylene alkyl ether carboxylic acid ester salt, a sulfate ester type surfactant such as a polyoxyethylene alkyl ether sulfonic acid ester salt, and a phosphoric acid ester type surfactant such as a polyoxyethylene alkyl ether phosphoric acid ester salt may be mentioned. However, by the addition of an anionic surfactant, since the dispersibility of a fluororesin powder is degraded, when a surfactant is added, a method in which, after the surfactant is added, production is completed before precipitation, separation, and/or the like occurs or a method in which, while stirring by ultrasonic waves or the like is always performed, production is continued is preferably performed.

In accordance with a fourth aspect of the present invention, there is provided a fluororesin composite which comprises: a porous base material; and the above-described fluororesin thin film of the present invention formed on one surface of the base material. This fluororesin composite may further comprise a metal foil on a surface of the fluororesin thin film opposite to the porous base material. When this metal foil is partly removed, a remaining metal foil may be used as a circuit applicable to a printed circuit board or the like.

In accordance with a fifth aspect of the present invention, there is provided a fluororesin composite which comprises: two porous base materials; and the fluororesin thin film of the present invention provided therebetween.

In both the fourth and fifth aspects of the present invention, the pore diameter, the material, and the like of the porous member used as the base material may be appropriately selected in accordance with its purposes; however, when a porous member having a porosity of 40% or more and a Gurley's number of 30 seconds or less is used as the base material, as a porous fluororesin composite which will be described in the following sixth aspect of the present invention, a composite having superior filtration ability can be obtained, and a high-performance separation membrane can be obtained. A porous member having a porosity of 60% or more and a Gurley's number of 15 seconds or less is more preferable. In addition, when the fluororesin thin film of the present invention is primarily composed of PTFE, as the porous base material, a stretched PTFE porous member manufactured by stretching a PTFE film is preferably mentioned by way of example. As the stretched PTFE porous member, either a single-axis stretched film or a multiple-axis stretched film may be used; however, in the following sixth aspect of the present invention, a single-axis stretched film, which has superior stretching workability, is preferably used.

Also in both the fourth and fifth aspects of the present invention, when a porous base material and the fluororesin thin film of the present invention are formed into a composite, a fluororesin composite having a superior mechanical strength as well as superior features of the fluororesin thin film of the present invention can be obtained, and this fluororesin composite can be easily handled when it is used and/or when it is further processed. For example, a composite which is made of this fluororesin composite and has no metal foil or the like, a stretching process can be easily performed. In particular, in the case of the fifth aspect, the two surfaces of the thin film are protected by the porous base materials, the composite has superior handling properties, and a process, such as stretching, can be easily performed.

The fluororesin composite of the present invention as described above can be obtained by a method comprising the steps of applying a fluororesin dispersion including a dispersing medium and a fluororesin powder dispersed therein between a flat and smooth foil and a porous base material; then drying the dispersing medium and sintering the fluororesin powder to form a fluororesin thin film. As a method for applying a fluororesin dispersion between a flat and smooth foil and a porous base material, for example, there may be mentioned a method in which after a fluororesin dispersion is applied on at least one of the flat and smooth foil and the base material, the above two is overlapped with each other.

The fluororesin composite of the present invention may also be obtained by a method comprising the steps of: applying a fluororesin dispersion including a dispersing medium and a fluororesin powder dispersed therein on a flat and smooth foil; then drying the dispersing medium and sintering the fluororesin powder to form a fluororesin thin film; and after the fluororesin thin film is formed, adhering the fluororesin thin film to a porous base material. The adhesion between the fluororesin thin film and the porous base material may be performed using an adhesive. A solvent-soluble or a thermoplastic fluororesin, or a fluororubber is more preferably used as the adhesive since the fluororesin composite can be used in application which requires the heat resistance and chemical resistance of a material forming the fluororesin thin film.

In any of the methods described above, after the fluororesin composite is formed, whenever necessary, the flat and smooth foil is removed. As described above, the fluororesin composite according to the fourth aspect can be obtained. In addition, when a metal foil is used as the flat and smooth foil and is used without being removed, the fluororesin composite disclosed in a foregoing paragraph can be obtained.

The fluororesin composite according to the fifth aspect of the present invention can be obtained by a method in which for example, two fluororesin composites each composed of the fluororesin composite according to the fourth aspect, that is, each composed of the porous base material and the fluororesin thin film of the present invention formed on one surface thereof, are laminated to each other so that the fluororesin thin films are overlapped with each other, and heating is then performed to a melting point or more of a fluororesin forming the thin films to adhere therebetween by fusion.

When the fluororesin thin film of the present invention is stretched, a porous fluororesin thin film can be obtained. In accordance with a sixth aspect of the present invention, there is provided a porous fluororesin composite manufactured by stretching the fluororesin composite according to the fourth or fifth aspect. When the fluororesin composite of the present invention is stretched, the fluororesin thin film included in the fluororesin composite is also stretched, and as a result, a porous fluororesin thin film is obtained.

As described above, this porous fluororesin thin film has minute and uniform pore diameters and a high porosity and, in addition, is formed from a film having a smaller number of defects; hence, a small number of defects, a high processing speed due to its small thickness, and superior filtering characteristics can be obtained.

However, when only a fluororesin thin film is used, handling cannot be easily performed when it is stretched, and hence it has been difficult to manufacture a porous fluororesin thin film. As described above, the fluororesin composites according the fourth and fifth aspects and, in particular, the fluororesin composite according to the fifth aspect can be easily handled during stretching, and hence the porous fluororesin thin film of the present invention can be easily manufactured using either one of the fluororesin composites according to the fourth and the fifth aspects.

The stretching temperature is preferably 200° C. or less, which is a temperature lower than the melting point of the fluororesin, more preferably 160° C. or less, and even more preferably 100° C. or less. When a casting method is used to form a fluororesin thin film, the thin film is non-oriented, isotropic, and uniform, and is uniformly extended by stretching; hence, a uniform porous fluororesin thin film can be obtained.

The porous fluororesin composite of the present invention is formed from a porous fluororesin thin film having a small number of defects as well as having minute and uniform pore diameters and a high porosity. Since having a small thickness, this film has a high processing speed and superior filtering characteristics. In addition, since the porous fluororesin thin film and the porous base material are formed into a composite, superior chemical resistance, heat resistance, and mechanical strength can also be obtained. Accordingly, the porous fluororesin composite of the present invention has superior chemical resistance, heat resistance, and mechanical strength as well as superior filtering characteristics and can be suitably used as a filter.

In addition, since having superior mechanical strength because of the porous base material and significantly high flexibility, the porous fluororesin composite of the present invention can be easily handled. Hence, the porous fluororesin composite of the present invention may be used for manufacturing known various types of separation membrane elements. For example, a separation membrane element (module) in which a large film area is packed in a compact container can be manufactured. As the separation membrane element described above, for example, there may be mentioned a pleated module type separation membrane element which includes a flat membrane itself, a spiral module type separation membrane element, or a tube module type separation membrane element in which after porous fluororesin composite thin films are wound around porous supporting members to form tubes, the tubes are bundled together.

Accordingly, when the porous fluororesin composite of the present invention is used as a filter of a separation membrane element, a separation membrane element having superior filtration ability, high maintainability, and a small decrease in filtration ability caused by clogging can be provided. In addition, a filtration system formed of this separation membrane element is suitably used for gas-liquid absorption, deaeration, and filtration in the fields of semiconductor, food, and the like.

When a porous fluororesin thin film used for a filter or the like is manufactured by stretching a fluororesin thin film, the molecular weight of a fluororesin used for a fluororesin dispersion is preferably 1,000,000 to 5,000,000, more preferably 1,000,000 to 3,500,000, and even more preferably 1,200,000 to 1,800,000. When the molecular weight is too high, the porosity tends to decrease, and when the molecular weight is too low, for example, pinholes tend to be formed, and/or the film tends to be broken during stretching.

In addition, the heat of fusion of the fluororesin is preferably in the range of 32 to less than 47.8 J/g, more preferably in the range of 32 to 44 J/g, and even more preferably in the range of 38 to 43 J/g. In this case, the measurement of the heat of fusion is performed by a thermal flux differential scanning calorimeter (thermal flux differential scanning calorimeter DSC-50 manufactured by Shimadzu Corporation) in accordance with the following method.

A sample in an amount of 10 to 20 mg is heated from room temperature to 245° C. at a rate of 50° C./minute and is then heated to 365° C. at a rate of 10° C./minute (first step). Next, cooling is performed to 350° C. at a rate of −10° C./minute and is then maintained at 350° C. for 5 minutes. Furthermore, cooling is performed from 350° C. to 330° C. at a rate of −10° C./minute and is then performed from 330° C. to 305° C. at a rate of −1° C./minute (second step). Subsequently, after cooling is performed from 305° C. to 245° C. at a rate of −50° C./minute, heating is performed from 245° C. to 365° C. at a rate of 10° C./minute (third step). In this case, a sampling time is 0.5 seconds per time. The amount of absorption heat of the first step is obtained by integration in the range of 303 to 353° C., that of the second step is obtained by integration in the range of 318 to 309° C., and that of the third step is obtained by integration in the range of 296 to 343° C.; the amount of absorption heat in the range of 296 to 343° C. of the third step is regarded as the heat of fusion.

Advantages

The fluororesin thin film of the present invention has a thickness which was not realized in the past, and the generation of defects, such as voids and/or cracks, is suppressed. For example, when this fluororesin thin film is stretched to form a porous film, a superior filter can be obtained having pores of uniform diameters, a high porosity, no defects, and a high processing speed.

The fluororesin thin film described above can be easily obtained by the method for manufacturing a fluororesin thin film of the present invention.

When the above fluororesin thin film is manufactured by using the fluororesin dispersion of the present invention, a thin film in which the generation of defects, such as voids and/or cracks, is further suppressed can be obtained.

The fluororesin composite of the present invention has a superior mechanical strength as well as having the superior features of the fluororesin thin film of the present invention. In addition, handling can be easily performed when this fluororesin composite is used and/or is further processed.

The porous fluororesin composite of the present invention has a superior mechanical strength as well as superior filtering characteristics.

BEST MODES FOR CARRYING OUT THE INVENTION

Next, the best modes for carrying out the present invention will be particularly described. However, the present invention is not limited to the modes and embodiments and may be changed to other modes without departing from the scope of the present invention.

FIGS. 1 to 3 are schematic cross-sectional views showing a structural example of a separation membrane element (module) of the present invention. In separation membrane elements shown below by way of example, the porous fluororesin composite according to the arrangement discussed in a foregoing paragraph is used as a separation membrane.

FIGS. 1 and 2 show a separation membrane element having the structure in which porous fluororesin films in the form of tubes are bundled together. FIG. 1 shows a cross-sectional view taken along a plane parallel to the longitudinal direction of the tube, and FIG. 2 shows a cross-sectional view taken along a plane perpendicular to the longitudinal direction of the tube. Reference numeral 1 in the figures indicates a porous fluororesin film in the form of a tube, and for example, a porous fluororesin film in the form of a belt spirally wound around a surface of a porous ceramic tube to cover the surface thereof may be mentioned.

A plurality of the tube-shaped porous fluororesin films 1 is provided (seven in FIG. 2), and the two ends thereof are collected together, and sealed, fixed, and united by fixing portions 2. Reference numerals 3 and 3' in FIG. 1 indicate an inlet and an outlet, respectively, of a process liquid, that is, an aqueous solution to be filtered. Reference numerals 4 and 4' in FIG. 1 indicate an inlet and an outlet, respectively, of a processed liquid, that is, a filtered aqueous solution. In FIG. 2 and the following FIG. 3, the inlet 4 and the outlet 4' are not shown.

In this example, the process liquid and processed liquid are circulated, and when the pressure at the process liquid side is set higher than that at the processed liquid side, the process liquid is partly allowed to pass to the processed liquid side, thereby performing filtration. A separation membrane element having the structure in which at least one of the outlets 3' and 4' is not provided, that is, the structure in which circulation is not performed, may also be formed. The portions indicated by reference numerals 3 and 3' in FIG. 1 may be used as the inlet and the outlet of the processed liquid, respectively, and the portions indicated by the reference numerals 4 and 4' in FIG. 1 may be used as the inlet and the outlet of the process liquid, respectively. In addition, the tube shape includes not only a circular cross-sectional shape but also another shape.

FIG. 3 is a schematic cross-sectional view taken along a plane perpendicular to the films and the flows of process and processed liquids, which shows a separation membrane element having the structure in which porous fluororesin films are overlapped with gaps provided therebetween and in which gaps formed between adjacent porous fluororesin films are sealed. In this figure, like components are designated by the same reference numerals as those shown in FIGS. 1 and 2; hence, although reference numeral 1 indicates a porous fluororesin film, these porous fluororesin films 1 each have a flat shape and are overlapped with each other (6 films are shown by way of example in this figure) as shown in the figure. In addition, the gap between adjacent porous fluororesin films 1 is sealed by sealing tools 5, and the process liquid is introduced in a space formed by the sealing tools 5 and the two porous fluororesin films 1 and is subjected to filtration.

As for the example shown in FIG. 3, a schematic cross-sectional view taken along the plane perpendicular to the film and parallel to the flows of the processed liquid and process liquids is the same as that shown in FIG. 1.

EXAMPLES

Example 1

PTFE dispersion AD911 (fluororesin dispersion manufactured by Asahi Glass Co., Ltd., heat of fusion of PTFE: 32 J/g) was applied on a stretched PTFE porous member (sold under the trade name Poreflon FP-100-100 manufactured by Sumitomo Electric Fine Polymer Inc.) (IPA-BP: 40 kPa, porosity: 75%, Gurley's number: 10.5 seconds) having a pore diameter of 1 μm and a thickness of 100 μm using a doctor knife having a gap of 10 μm, and an aluminum foil having a thickness of 15 μm was provided to cover the PTFE dispersion so as not to trap air bubbles therebetween. After steps of drying at 80° C. for 60 minutes, heating at 250° C. for 1 hour, heating at 340° C. for 1 hour, and heating at 317.5° C. for 8 hours were sequentially performed, by spontaneous cooling, a composite was obtained in which a fluororesin thin film (cast film) was formed on the stretched PTFE porous member, and the aluminum foil was further fixed on the fluororesin thin film. Next, the aluminum foil was removed by dissolution using hydrochloric acid, so that a test sample (fluororesin composite of the present invention) was obtained.

Example 2

PTFE dispersion AD911 and PFA dispersion 920 HP (manufactured by E. I. du Pont, MFI of PFA: 30 g/minute) were mixed together to obtain a fluororesin dispersion having a PFA volume ratio of 7%. In this example, the PFA volume ratio is a volume ratio of PFA (solid component) to the total volume of the fluororesin (solid component), that is, a value indicating PFA/(PTFE+PFA) (volume ratio of solid component of fluororesin). A test sample was obtained in a manner similar to that in Example 1 except that this fluororesin dispersion thus prepared was used instead of the PTFE dispersion AD911.

Example 3

PTFE dispersion AD911 and PFA dispersion 920 HP were mixed together to obtain a fluororesin dispersion having a PFA volume ratio of 4%. A test sample was obtained in a manner similar to that in Example 1 except that this fluororesin dispersion thus prepared was used instead of the PTFE dispersion AD911.

Example 4

PTFE dispersion AD911 and PFA dispersion 920 HP were mixed together to obtain a fluororesin dispersion having a PFA volume ratio of 2%. A test sample was obtained in a manner similar to that in Example 1 except that this fluororesin dispersion thus prepared was used instead of the PTFE dispersion AD911.

Example 5

PTFE dispersion AD911 and a MFA latex (latex included PFA which was different from PFA of PFA dispersion 920 HP. Hereinafter, this PFA was called MFA, which was manufactured by Solvay-Solexis S.p.A, MFI of MFA: 7 g/minute) were mixed together to obtain a fluororesin dispersion having a MFA volume ratio of 4%. In this example, the MFA volume ratio is a volume ratio of MFA (solid component) to the total volume of the fluororesin (solid component), that is, a value indicating MFA/(PTFE+MFA) (volume ratio of solid component of fluororesin). A test sample was obtained in a manner similar to that in Example 1 except that this fluororesin dispersion thus prepared was used instead of the PTFE dispersion AD911.

Example 6

PTFE dispersion AD911 and the MFA latex were mixed together to obtain a fluororesin dispersion having a MFA volume ratio of 2%. A test sample was obtained in a manner similar to that in Example 1 except that this fluororesin dispersion thus prepared was used instead of the PTFE dispersion AD911.

Example 7

By using PTFE dispersion AD911, the MFA latex, and PFA dispersion 920 HP, a fluororesin dispersion having a MFA/(PTFE+MFA+PFA) (volume ratio of solid component of fluororesin) of 2% and a PFA/(PTFE+MFA+PFA) (volume ratio of solid component of fluororesin) of 2% was prepared. A test sample was obtained in a manner similar to that in Example 1 except that this fluororesin dispersion thus prepared was used instead of the PTFE dispersion AD911.

Example 8

By using PTFE dispersion AD911, the MFA latex, and PFA dispersion 920 HP, a fluororesin dispersion having a MFA/(PTFE+MFA+PFA) (volume ratio of solid component of fluororesin) of 2% and a PFA/(PTFE+MFA+PFA) (volume ratio of solid component of fluororesin) of 2% was prepared, and a polyethylene oxide having a molecular weight of 2,000,000 was further added to have a concentration of 3 mg/ml. A test sample was obtained in a manner similar to that in Example 1 except that this fluororesin dispersion thus prepared was used instead of the PTFE dispersion AD911.

Comparative Example 1

Poreflon FP-100-100 itself was used as a test sample.

Comparative Example 2

PTFE dispersion AD911 was applied to Poreflon FP-100-100 using a doctor knife having a gap of 10 μm. After steps of drying at 80° C. for 60 minutes, heating at 250° C. for 1 hour, heating at 340° C. for 1 hour, and heating at 317.5° C. for 8 hours were sequentially performed, by spontaneous cooling, a test sample (fluororesin composite) in which a fluororesin thin film (cast film) was formed on the stretched PTFE porous member was obtained.

Comparative Example 3

PFA dispersion 920 HP was applied to Poreflon FP-100-100 using a doctor knife having a gap of 10 μm. Subsequently, a test sample was obtained in a manner similar to that in Comparative Example 2.

Comparative Example 4

PTFE dispersion AD911 and PFA dispersion 920 HP were mixed together to obtain a fluororesin dispersion having a PFA volume ratio of 37%. A test sample was obtained in a manner similar to that in Comparative Example 2 except that this fluororesin dispersion thus prepared was used instead of the PTFE dispersion AD911.

Comparative Example 5

PTFE dispersion AD911 and PFA dispersion 920 HP were mixed together to obtain a fluororesin dispersion having a PFA volume ratio of 17%. A test sample was obtained in a manner similar to that in Comparative Example 2 except that this fluororesin dispersion thus prepared was used instead of the PTFE dispersion AD911.

Comparative Example 6

PTFE dispersion AD911 and PFA dispersion 920 HP were mixed together to obtain a fluororesin dispersion having a PFA volume ratio of 7%. A test sample was obtained in a manner similar to that in Comparative Example 2 except that this fluororesin dispersion thus prepared was used instead of the PTFE dispersion AD911.

Comparative Example 7

PTFE dispersion AD911 and PFA dispersion 920 HP were mixed together to obtain a fluororesin dispersion having a PFA volume ratio of 4%. A test sample was obtained in a manner similar to that in Comparative Example 2 except that this fluororesin dispersion thus prepared was used instead of the PTFE dispersion AD911.

The thicknesses of the cast films of the test samples obtained in Examples 1 to 8 and Comparative Examples 2 to 7 were all approximately 3 μm.

The air permeability of each of the test samples obtained from the above examples and comparative examples was measured, and the denseness of each cast film was also observed. In addition, the generation of defects and a defect area ratio were measured. The measurement method and the evaluation standard are as follows.

[Measurement Method of Air Permeability (Gurley's Number)]

Measurement was performed using an Oken-type air permeability measurement device (manufactured by Asahi Seiko Co., Ltd.) having the same structure as that of a Gurley air-permeability test device in accordance with JIS P 8117 (air-permeability test method of paper and paper board). The measurement results are shown by the Gurley's number.

[Measurement of Denseness of Cast Film and Measurement of Defects]

The conditions (denseness, crystalline structure, and film thickness) of the cast film were observed using a scanning electron microscope (SEM). In addition, the presence of apparent defects was confirmed. The measurement results are shown in Table I.

[Calculation of defect area ratio] Calculation was performed by the following formula.

(Gurley's number of Poreflon FP-100-100/Gurley's number of prepared fluororesin composite)×100 (%)

TABLE I

|  | Gurley's number | SEM observation | | Defect area ratio % |
| --- | --- | --- | --- | --- |
|  |  | Denseness | Presence of defects |  |
| Example 1 | 310 ± 94 | (*1) | No apparent defects | 3.4 |
| Example 2 | 647 ± 105 | Dense (strong crystalline structure) | No apparent defects | 1.6 |
| Example 3 | 833 ± 249 | Dense (strong crystalline structure) | No apparent defects | 1.3 |
| Example 4 | 1083 ± 225 | Dense (strong crystalline structure) | No apparent defects | 0.97 |
| Example 5 | 1533 ± 47 | Dense (weak crystalline structure) | No apparent defects | 0.68 |
| Example 6 | 1400 ± 163 | Dense (weak crystalline structure) | No apparent defects | 0.75 |
| Example 7 | 3833 ± 850 | Dense (strong crystalline structure) | No apparent defects | 0.27 |
| Example 8 | 5,000≤ | Dense (strong crystalline structure) | No apparent defects | 0.2 |
| Comparative Example 1 | 10.5 | — | Yes | 100 |
| Comparative Example 2 | 24 | Coarse (no recrystallization) | Yes | 44 |
| Comparative Example 3 | 25 | Vague | Yes | 42 |
| Comparative Example 4 | 22 | Dense (recrystallization being vague) | Yes | 48 |
| Comparative Example 5 | 23 | Dense (recrystallization being vague) | Yes | 46 |
| Comparative Example 6 | 21 | Dense (strong crystalline structure) | Yes | 50 |
| Comparative Example 7 | 34 | Dense (strong crystalline structure) | Yes | 31 |

(*1) surface layer (layer in contact with aluminum foil) is dense (strong crystalline structure), cross-section is coarse (no recrystallization).

As shown in Table I, the thin films obtained in the examples were all dense, and a PTFE crystallized irregular structure could be confirmed. In addition, it was shown that although the thicknesses of the thin films obtained in the examples were all 3 μm, every fluororesin thin film had a Gurley's number of 300 seconds or more, a very smaller defect area ratio than that of each of the comparative examples, and a small number of defects. In particular, in Examples 2 to 7 in which the thermoplastic fluororesin was added, it was shown that the Gurley's number was further increased, and that the number of defects was further decreased. In addition, the cross-sectional structure was also further densified. In particular, in Examples 8 in which a polyethylene oxide was added, it was confirmed that the Gurley's number was 5,000 seconds or more, and that the defect area ratio was very small.

Example 9

After two test samples (fluororesin composites) obtained in Example 8 were adhered to each other so that the two thin film sides faced each other and were then provided between crystallized glasses each having a thickness of 5 mm, heating at 340° C. for 1 hour and subsequent heating at 317° C. for 8 hours were performed, thereby forming a fluororesin composite. It was shown that this fluororesin composite had a Gurley's number of 5,000 seconds or more and included a fluororesin thin film having a small number of defects.

Next, the fluororesin composite was stretched in a width direction using a tensile testing device (Autograph AG500E manufactured by Shimadzu Corporation) under the conditions in which the temperature was 60° C., the initial distance between chucks was 30 mm, and the stroke was 120 mm (elongation rate of 400%). It was shown that the stretched fluororesin composite had a low Gurley's number of 15 seconds and a high permeability. On the other hand, since the IPA bubble point was high, such as 683 kPa, it was shown that the pore diameter was very small. That is, although the minute pores were provided, a porous fluororesin composite having superior filtering characteristics could be obtained.

Reference Examples 1 to 6

Selection of Surfactant Suitable for Lubrication

An aluminum foil having a thickness of 50 μm and a width of 50 mm was sandwiched between two rods made of stainless steel having a diameter of 20 mm, which were in contact with each other at a load of 496 gf (normal force) including its own weight, and a load necessary to pull out the aluminum foil a distance of 150 mm at a rate of 0.5 m/minute was measured by a load cell. The value obtained by dividing the average load by the normal force was defined as the friction coefficient. The friction coefficient was measured two to four times, and by the average value thereof, the lubricity of various aqueous solutions shown in Table II was evaluated. Since it was supposed that the viscous properties might have some influence, the viscosity was also measured by a B-type viscosity meter. The results are shown in Table II.

TABLE II

|  | Viscosity cp | Friction coefficient |
|---|---|---|
| Reference Example 1. distilled water | 3.5 | 0.69 |
| Reference Example 2. polyoxyethylene fatty acid ester | | |
| 20 mg/ml of aqueous solution manufactured by Wako Chemical Ltd. | 4.2 | 0.58 |
| Reference Example 3. polyoxyethylene methacrylate | | |
| (1) 20 mg/ml of aqueous solution, MA-100 manufactured by Nippon Nyukazai Co., Ltd. | 3.3 | 0.59 |
| (2) 20 mg/ml of aqueous solution, MA-80 manufactured by Nippon Nyukazai Co., Ltd. | 3.3 | 0.67 |
| (3) 20 mg/ml of aqueous solution, MA-50 manufactured by Nippon Nyukazai Co., Ltd. | 3.8 | 0.6 |
| Reference Example 4. polyoxyethylene alkyl ether fatty acid ester | | |
| (1) 20 mg/ml of aqueous solution, 3299RV manufactured by Kao Corporation | 279 | 0.48 |
| (2) 20 mg/ml of aqueous solution, 3299V manufactured by Kao Corporation | 22 | 0.43 |
| (3) 20 mg/ml of aqueous solution, 3199V manufactured by Kao Corporation | 5.6 | 0.45 |
| (4) 20 mg/ml of aqueous solution, 1112 manufactured by Kao Corporation | 3.8 | 0.41 |
| Reference Example 5. polyoxyethylene alkyl ether sulfuric acid ester sodium | | |
| (1) 20 mg/ml of aqueous solution, 20C manufactured by Kao Corporation | 3.7 | 0.35 |
| (2) 20 mg/ml of aqueous solution, 27C manufactured by Kao Corporation | 6.8 | 0.27 |
| Reference Example 6. polyoxyethylene alkyl ether sulfuric acid ester triethanol amine | | |
| (1) 20 mg/ml of aqueous solution, 20T manufactured by Kao Corporation | 3.6 | 0.15 |
| (2) 10 mg/ml of aqueous solution, 20T manufactured by Kao Corporation | 3.7 | 0.18 |
| (3) 5 mg/ml of aqueous solution, 20T manufactured by Kao Corporation | 3.2 | 0.25 |
| (4) 2.5 mg/ml of aqueous solution, 20T manufactured by Kao Corporation | 3.9 | 0.26 |
| (5) 1 mg/ml of aqueous solution, 20T manufactured by Kao Corporation | 3.5 | 0.46 |
| (6) 0.5 mg/ml of aqueous solution, 20T manufactured by Kao Corporation | 3.0 | 0.38 |

As shown in Table II, the friction coefficient of each of aqueous solutions of a polyoxyethylene alkyl ether fatty acid ester (Reference Example 4), a polyoxyethylene alkyl ether sulfuric acid ester sodium (Reference Example 5), and a polyoxyethylene alkyl ether sulfuric acid ester triethanol amine (Reference Example 6), each having a surfactant structure including an alkyl group functioning as a hydrophobic group, was lower than that of an aqueous solution group of a polyoxyethylene fatty acid ester (Reference Example 2) and a polyoxyethylene methacrylate (Reference Example 3), each of which is a hydrophilic polymer having no hydrophobic groups. Among those mentioned above, the friction coefficients of the surfactants (Reference Examples 5 and 6) having a sulfuric acid ester group were lower, and the friction coefficient of a polyoxyethylene alkyl ether sulfuric acid ester triethanol amine (Reference Example 6) was particularly low, so that a superior effect was obtained at a component concentration of 0.5 mg/ml or more. In addition, the number of scratches formed on the aluminum foil was smallest when the confirmation was made only by the naked eye.

Example 10

By using PTFE dispersion AD911, the MFA latex, and PFA dispersion 920 HP, a fluororesin dispersion having a MFA/(PTFE+MFA+PFA) (volume ratio of solid component of fluororesin) of 2% and a PFA/(PTFE+MFA+PFA) (volume ratio of solid component of fluororesin) of 2% was prepared, and a polyethylene oxide having a molecular weight of 2,000,000 and a polyoxyethylene alkyl ether sulfuric acid ester triethanol amine (20T manufactured by Kao Corporation) were further added to have concentrations of 3 mg/ml and 10 mg/ml, respectively, so that a fluororesin dispersion was prepared.

After an aluminum foil having a thickness of 50 μm was spread and fixed on a flat glass plate so as not to generate any wrinkles, and the fluororesin dispersion was dripped, the fluororesin dispersion was extended so as to be uniformly spread over the surface of the aluminum foil, for example, by rolling a slide shaft (sold under the trade name Stainless Fine Shaft SNSF type, outside diameter: 20 mm) made of stainless steel manufactured by Nippon Bearing Co., Ltd.

After this foil was sequentially processed by steps of drying at 80° C. for 60 minutes, heating at 250° C. for 1 hour, and heating at 340° C. for 1 hour, spontaneous cooling was performed, so that a fluororesin thin film fixed on the aluminum foil was formed. The average thickness of the fluororesin thin film calculated from the difference in weight of the aluminum foil per unit area before and after the fluororesin thin was formed and the absolute specific gravity thereof (2.25 g/cm$^3$) was approximately 3 μm.

Next, a polyethylene oxide having a molecular weight of 2,000,000 and a polyoxyethylene alkyl ether sulfuric acid ester triethanol amine (20T manufactured by Kao Corporation) were added to a PFA dispersion obtained by diluting 920 HP with distilled water into a volume four times the original one to have concentrations of 3 mg/ml and 10 mg/ml, respectively, so that a four-time diluted PFA dispersion was prepared.

After the fluororesin thin film fixed on the aluminum foil was spread and fixed on a flat glass plate so as not to generate any wrinkles, and this four-time diluted PFA dispersion was dripped, while the four-time diluted PFA was extended so as to be uniformly spread over the surface of the aluminum foil, for example, by rolling the same slide shaft made of stainless steel manufactured by Nippon Bearing Co., Ltd. as described above, a stretched PTFE porous member (sold under the trade name Poreflon FP-045-80 manufactured by Sumitomo Electric Fine Polymer Inc.) (IPA-BP: 150 kPa, porosity: 70%, Gurley's number: 9.1 seconds) having a pore diameter of 0.45 μm and a thickness of 80 μm was provided before the moisture was dried up. Subsequently, after steps of drying at 80° C. for 60 minutes, heating at 250° C. for 1 hour, heating at 320° C. for 1 hour, and heating at 317.5° C. for 8 hours were sequentially performed, by spontaneous cooling, a composite was obtained in which a fluororesin thin film, which included PTFE as a primary component and which was composed of a mixture including PTFE, MFA, and PFA, was adhered onto the stretched PTFE porous member by the thermoplastic PFA having a melting point lower than that of PTFE and in which the aluminum foil was fixed on the above fluororesin thin film. Next, the aluminum foil was removed by dissolution using hydrochloric acid, so that a test sample was obtained.

The Gurley's number of this test sample was 5,000 seconds or more. In addition, when the IPA permeation test was performed under the following conditions, the IPA permeation was not detected, and it was confirmed that minute defects, that is, minute defects which allowed IPA applied to a film horizontally placed to spontaneously pass therethrough and reach the bottom surface of the film by the gravity and capillary phenomenon, were not substantially present.

[Conditions for IPA Permeation Test]
Application amount of IPA on film: 10 ml
Film area: 273 cm$^2$
Temperature: 25° C.

IPA was uniformly applied using a brush, and after 30 seconds elapsed, the presence of IPA that reached the bottom surface of filter paper was observed.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a low Gurley's number of 25 seconds and a high permeability. The IPA bubble point was 660 kPa. Since the capture rate of this film for 0.055-μm standard particles was high, such as 100%, and the discharge rate of a filtered liquid hardly changed during the capture-rate measurement, it was shown that this porous fluororesin composite had a superior capture rate, hardly caused clogging, and could be used as a significantly effective separation membrane for a separation membrane element. In addition, since the mean flow pore diameter was 0.047 μm, it was also shown that very minute continuous pores were formed. An electron microscope photograph (5,000 magnitudes) of this porous fluororesin composite is shown in FIG. 4.

In this example, the IPA bubble point indicates a pressure which is obtained such that after a test sample is immersed in isopropyl alcohol (IPA) so as to sufficiently fill its pores therewith, an air pressure is gradually applied to one surface of the test sample, and a pressure at which a bubble first comes out of the opposite surface is measured as the IPA bubble point. In addition, the measurement methods of the capture rate and the mean flow pore diameter are as follows. In this example, the IPA bubble point and the mean flow pore diameter were measured in accordance with ASTM F316-86 and ASTM E1294-89.

[Measurement Method of Capture Rate]

A latex of spherical polystyrene particles having an outside diameter of 0.055 μm (standard particle latex STADEX SC-0055-D, solid component: 1%, manufactured by JSR Corp.) was diluted 1000 times with purified water (solid component: 0.001%), and this liquid was used as a test liquid. After a prepared sample was punched into a disc shape having a diameter of 47 mm and was immersed in isopropyl alcohol, the sample was fixed on a filtration holder and was used to filter 32 ml of the test liquid under a differential pressure of 0.42 kgf/cm$^2$. The concentration of the standard particles in the test liquid and that in the filtrate were measured using a spectrophotometer (UV-160 manufactured by Shimadzu Corp.), and the capture rate was calculated according to the following formula.

Capture rate=(1−standard particle concentration in filtrate)/(standard particle concentration in test liquid)×100[%]

[Measurement Method of Mean Flow Pore Diameter]

Measurement was performed by a pore distribution measurement device (Palm Porometer CFP-1500A manufactured by Porous Materials, Inc.) using GALWICK (propylene, 1,1,2,3,3,3 hexafluoro oxidized manufactured by Porous Materials, Inc.). In particular, the mean flow pore diameter can be obtained as follows. The relationship between a differential pressure applied to a film and an air flow rate passing therethrough is measured when the film is dried and is also measured when the film is wet, and the graphs thus obtained are called a dry curve and a wet curve, respectively. A differential pressure at the intersection between a curve obtained when the flow rates of the dry curve are decreased to one half and the wet curve is represented by P(Pa). The mean flow pore diameter is obtained by the following formula.

Mean flow pore diameter $d$ (μm)=$c\gamma/P$

In the above formula, c indicates a constant of 2,860, and $\gamma$ indicates the surface tension (dynes/cm) of the liquid.

Example 11

A fluororesin dispersion was prepared by adding a polyethylene oxide having a molecular weight of 2,000,000 and a polyoxyethylene alkyl ether sulfuric acid ester triethanol amine (20T manufactured by Kao Corporation) to the MFA latex so as to have concentrations of 3 mg/ml and 10 mg/ml, respectively.

After an aluminum foil having a thickness of 50 μm was spread and fixed on a flat glass plate so as not to generate any wrinkles, and the fluororesin dispersion thus obtained was dripped on the foil, the fluororesin dispersion was extended so as to be uniformly spread over the surface of the aluminum foil, for example, by rolling the same slide shaft made of stainless steel manufactured by Nippon Bearing Co., Ltd as described above.

After this foil was sequentially processed by steps of drying at 80° C. for 60 minutes, heating at 250° C. for 1 hour, and heating at 340° C. for 1 hour, spontaneous cooling was performed, so that a fluororesin thin film fixed on the aluminum foil was formed. The average thickness of the fluororesin thin film calculated from the difference in weight of the aluminum foil per unit area before and after the fluororesin thin was formed and the absolute specific gravity thereof was approximately 3 μm.

Next, a polyethylene oxide having a molecular weight of 2,000,000 and a polyoxyethylene alkyl ether sulfuric acid ester triethanol amine (20T manufactured by Kao Corporation) were added to a PFA dispersion obtained by diluting 920 HP with distilled water into a volume four times the original volume to have concentrations of 3 mg/ml and 10 mg/ml, respectively, so that a four-time diluted PFA dispersion was prepared.

After the fluororesin thin film fixed on the aluminum foil was spread and fixed on a flat glass plate so as not to generate any wrinkles, and this four-time diluted PFA dispersion was dripped, while the four-time diluted PFA was extended so as to be uniformly spread over the surface of the aluminum foil, for example, by rolling the same slide shaft made of stainless steel manufactured by Nippon Bearing Co., Ltd. as described above, a stretched PTFE porous member (Poreflon FP-045-80) was provided before the moisture was dried up. Subsequently, after steps of drying at 80° C. for 60 minutes, heating at 250° C. for 1 hour, heating at 320° C. for 1 hour, and heating at 317.5° C. for 8 hours were sequentially performed, by spontaneous cooling, a composite was obtained in which a fluororesin thin film composed of MFA was adhered onto the stretched PTFE porous member by the thermoplastic MFA having a melting point lower than that of PTFE and in which the aluminum foil was fixed on the above fluororesin thin film. Next, the aluminum foil was removed by dissolution using hydrochloric acid, so that a test sample was obtained.

The Gurley's number of this test sample was 5,000 seconds or more, the IPA permeation was not detected by the IPA permeation test, and it was confirmed that minute defects were not substantially present.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a low Gurley's number of 21 seconds and a high permeability. The IPA bubble point was 14 kPa. In addition, it was shown that the mean flow pore diameter was 0.098 μm and that very minute continuous pores were formed. An electron microscope photograph (5,000 magnitudes) of this porous fluororesin composite is shown in FIG. 5.

Comparative Example 8

By using PTFE dispersion AD911, the MFA latex, and PFA dispersion 920 HP, a fluororesin dispersion having a MFA/(PTFE+MFA+PFA) (volume ratio of solid component of fluororesin) of 2% and a PFA/(PTFE+MFA+PFA) (volume ratio of solid component of fluororesin) of 2% was prepared, and a polyethylene oxide having a molecular weight of 2,000,000 and a polyoxyethylene alkyl ether sulfuric acid ester triethanol amine (20T manufactured by Kao Corporation) were further added to have concentrations of 3 mg/ml and 10 mg/ml, respectively, so that a fluororesin dispersion was prepared.

After an aluminum foil having a thickness of 50 μm was spread and fixed on a flat glass plate so as not to generate any wrinkles, and the fluororesin dispersion was dripped on the foil, the fluororesin dispersion was extended so as to be uniformly spread over the surface of the aluminum foil, for example, by rolling a slide shaft (sold under the trade name Stainless Fine Shaft SNSF type, outside diameter: 20 mm) made of stainless steel manufactured by Nippon Bearing Co., Ltd. After this foil was sequentially processed by steps of drying at 80° C. for 60 minutes, heating at 250° C. for 1 hour, heating at 340° C. for 1 hour, and heating at 317.5° C. for 8 hours, spontaneous cooling was performed, so that a fluororesin thin film fixed on the aluminum foil was formed. The average thickness of the fluororesin thin film calculated from the difference in weight of the aluminum foil per unit area before and after the fluororesin thin was formed and the absolute specific gravity thereof (2.25 g/cm$^3$) was approximately 3 μm.

Next, the aluminum foil was removed by dissolution using hydrochloric acid, so that a test sample was obtained. Although it was attempted to stretch this test sample using a tensile testing device, the handling was very difficult since the test sample was so thin that wrinkles were liable to generate, and the test sample was also liable to be broken, for example, when it was chucked, so that uniform stretching could not be performed.

Reference Example 7

The IPA bubble point of Poreflon HP-010-30 (PTFE filter manufactured by Sumitomo Electric Fine Polymer Inc.) was 180 kPa and the Gurley's number thereof was 22 seconds. In addition, the result of measurement of the capture rate of Poreflon HP-010-30 for 0.055-μm particles was 0%. In addition, the mean flow pore diameter was 0.14 μm. In addition, an electron microscope photograph (5,000 magnitudes) of this filter is shown in FIG. 6.

Example 12

A fluororesin dispersion was prepared using PTFE dispersion AD911 and the MFA latex to have a MFA/(PTFE+MFA) (volume ratio of solid component of fluororesin) of 20%, and by adding a polyethylene oxide having a molecular weight of 2,000,000 and a polyoxyethylene alkyl ether sulfuric acid ester triethanol amine (20T manufactured by Kao Corporation) so as to have concentrations of 3 mg/ml and 10 mg/ml, respectively, so that a fluororesin dispersion was prepared.

After an aluminum foil having a thickness of 50 μm was spread and fixed on a flat glass plate so as not to generate any wrinkles, and the fluororesin dispersion thus obtained was dripped on the foil, this fluororesin dispersion was extended so as to be uniformly spread over the surface of the aluminum foil, for example, by rolling a slide shaft (sold under the trade name Stainless Fine Shaft SNSF type, outside diameter: 20 mm) made of stainless steel manufactured by Nippon Bearing Co., Ltd. After this foil was sequentially processed by steps of drying at 80° C. for 60 minutes, heating at 250° C. for 1 hour, and heating at 340° C. for 1 hour, spontaneous cooling was performed, so that a fluororesin thin film fixed on the aluminum foil was formed.

Next, a polyethylene oxide having a molecular weight of 2,000,000 and a polyoxyethylene alkyl ether sulfuric acid ester triethanol amine (20T manufactured by Kao Corporation) were added to a PFA dispersion obtained by diluting 920 HP with distilled water into a volume four times the original volume to have concentrations of 3 mg/ml and 10 mg/ml, respectively, so that a four-time diluted PFA dispersion was prepared.

After the fluororesin thin film fixed on the aluminum foil was spread and fixed on a flat glass plate so as not to generate any wrinkles, and this four-time diluted PFA dispersion was dripped, while the four-time diluted PFA was extended so as to be uniformly spread over the surface of the aluminum foil, for example, by rolling the same slide shaft made of stainless steel manufactured by Nippon Bearing Co., Ltd. as described above, a stretched PTFE porous member (sold under the trade name Poreflon FP-045-80 manufactured by Sumitomo Electric Fine Polymer Inc.) (IPA-BP: 150 kPa, porosity: 70%, Gurley's number: 9.1 seconds) having a pore diameter of 0.45 μm and a thickness of 80 μm was provided before the moisture was dried up. Subsequently, after steps of drying at 80° C. for 60 minutes, heating at 250° C. for 1 hour, heating at 320° C. for 1 hour, and heating at 317.5° C. for 8 hours were sequentially performed, by spontaneous cooling, a composite was obtained in which a fluororesin thin film including PTFE as a primary component and composed of a mixture of MFA and PTFE was adhered onto the stretched PTFE porous member by the thermoplastic MFA having a melting point lower than that of PTFE and in which the aluminum foil was fixed on the above fluororesin thin film. Next, the aluminum foil was removed by dissolution using hydrochloric acid, so that a test sample was obtained.

The Gurley's number of this test sample was 5,000 seconds or more, and when isopropyl alcohol was brought into contact with the test sample at the fluororesin thin film side at room temperature, no pores which allowed IPA to permeate therethrough were present; hence, it was shown that a fluororesin composite including a fluororesin thin film which allowed no IPA to permeate therethrough was obtained.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a low Gurley's number of 19 seconds and a high permeability. The IPA bubble point was 148 kPa. The mean flow pore diameter was 0.13 μm.

Example 13

A fluororesin thin film fixed on an aluminum foil was formed in a manner similar to that in Example 12 except that the fluororesin dispersion was changed to a fluororesin dispersion which was prepared using PTFE dispersion AD911 and the MFA latex to have a MFA/(PTFE+MFA) (volume ratio of solid component of fluororesin) of 40%. In addition, by using this fluororesin thin film fixed on the aluminum foil, a composite was obtained in a manner similar to that in Example 12 in which the fluororesin thin film composed of the mixture of PTFE and MFA was adhered onto a stretched PTFE porous member by MFA and in which the aluminum foil was fixed on the fluororesin thin film. Next, the aluminum foil was removed by dissolution using hydrochloric acid, so that a test sample was obtained.

The Gurley's number of this test sample was 5,000 seconds or more, and when isopropyl alcohol was brought into contact with the test sample at the fluororesin thin film side at room temperature, no pores which allowed IPA to permeate therethrough were present; hence, it was shown that a fluororesin composite including a fluororesin thin film which allowed no IPA to permeate therethrough was obtained.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a Gurley's number of 38 seconds. The IPA bubble point was 277 kPa. The mean flow pore diameter was 0.071 μm.

Example 14

A fluororesin thin film fixed on an aluminum foil was formed in a manner similar to that in Example 12 except that the fluororesin dispersion was changed to a fluororesin dispersion which was prepared using PTFE dispersion AD911 and the MFA latex to have a MFA/(PTFE+MFA) (volume ratio of solid component of fluororesin) of 60%. In addition, by using this fluororesin thin film fixed on the aluminum foil, a composite was obtained in a manner similar to that in Example 12 in which the fluororesin thin film composed of the mixture of PTFE and MFA was adhered onto a stretched PTFE porous member by MFA and in which the aluminum foil was fixed on the fluororesin thin film. Next, the aluminum foil was removed by dissolution using hydrochloric acid, so that a test sample was obtained.

The Gurley's number of this test sample was 5,000 seconds or more, and when isopropyl alcohol was brought into contact with the test sample at the fluororesin thin film side at room temperature, no pores which allowed IPA to permeate therethrough were present; hence, it was shown that a fluororesin composite including a fluororesin thin film which allowed no IPA to permeate therethrough was obtained.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a Gurley's number of 20 seconds. The IPA bubble point was 23 kPa. The mean flow pore diameter was 0.0768 µm.

Example 15

A fluororesin thin film fixed on an aluminum foil was formed in a manner similar to that in Example 12 except that the fluororesin dispersion was changed to a fluororesin dispersion which was prepared using PTFE dispersion AD911 and the MFA latex to have a MFA/(PTFE+MFA) (volume ratio of solid component of fluororesin) of 10%. (The average thickness of the fluororesin thin film calculated from the difference in weight of the aluminum foil per unit area before and after the fluororesin thin was formed and the absolute specific gravity thereof (2.25 g/cm$^3$) was approximately 3 µm.)

In addition, by using this fluororesin thin film fixed on the aluminum foil, a composite was obtained in a manner similar to that in Example 12 in which the fluororesin thin film composed of the mixture of PTFE and MFA was adhered onto a stretched PTFE porous member by MFA and in which the aluminum foil was fixed on the fluororesin thin film. Next, the aluminum foil was removed by dissolution using hydrochloric acid, so that a test sample was obtained.

The Gurley's number of this test sample was 5,000 seconds or more, and when isopropyl alcohol was brought into contact with the test sample at the fluororesin thin film side at room temperature, no pores which allowed IPA to permeate therethrough were present; hence, it was shown that a fluororesin composite including a fluororesin thin film which allowed no IPA to permeate therethrough was obtained.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a Gurley's number of 29 seconds. The IPA bubble point was 426 kPa. The mean flow pore diameter was 0.062 µm.

Example 16

A fluororesin thin film fixed on an aluminum foil was formed in a manner similar to that in Example 12 except that the fluororesin dispersion was changed to a fluororesin dispersion which was prepared using PTFE dispersion AD911 and the MFA latex to have a MFA/(PTFE+MFA) (volume ratio of solid component of fluororesin) of 12.5%. (The average thickness of the fluororesin thin film calculated from the difference in weight of the aluminum foil per unit area before and after the fluororesin thin was formed and the absolute specific gravity thereof (2.25 g/cm$^3$) was approximately 3 µm.)

In addition, by using this fluororesin thin film fixed on the aluminum foil, a composite was obtained in a manner similar to that in Example 12 in which the fluororesin thin film composed of the mixture of PTFE and MFA was adhered onto a stretched PTFE porous member by MFA and in which the aluminum foil was fixed on the fluororesin thin film. Next, the aluminum foil was removed by dissolution using hydrochloric acid, so that a test sample was obtained.

The Gurley's number of this test sample was 5,000 seconds or more, and when isopropyl alcohol was brought into contact with the test sample at the fluororesin thin film side at room temperature, no pores which allowed IPA to permeate therethrough were present; hence, it was shown that a fluororesin composite including a fluororesin thin film which allowed no IPA to permeate therethrough was obtained.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a Gurley's number of 22 seconds. The IPA bubble point was 261 kPa. The mean flow pore diameter was 0.060 µm.

Example 17

A fluororesin thin film fixed on an aluminum foil was formed in a manner similar to that in Example 12 except that the fluororesin dispersion was changed to a fluororesin dispersion which was prepared using PTFE dispersion AD911 and the MFA latex to have a MFA/(PTFE+MFA) (volume ratio of solid component of fluororesin) of 15%. (The average thickness of the fluororesin thin film calculated from the difference in weight of the aluminum foil per unit area before and after the fluororesin thin was formed and the absolute specific gravity thereof (2.25 g/cm$^3$) was approximately 3 µm.)

In addition, by using this fluororesin thin film fixed on the aluminum foil, a composite was obtained in a manner similar to that in Example 12 in which the fluororesin thin film composed of the mixture of PTFE and MFA was adhered onto a stretched PTFE porous member by MFA and in which the aluminum foil was fixed on the fluororesin thin film. Next, the aluminum foil was removed by dissolution using hydrochloric acid, so that a test sample was obtained.

The Gurley's number of this test sample was 5,000 seconds or more, and when isopropyl alcohol was brought into contact with the test sample at the fluororesin thin film side at room temperature, no pores which allowed IPA to permeate therethrough were present; hence, it was shown that a fluororesin composite including a fluororesin thin film which allowed no IPA to permeate therethrough was obtained.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a Gurley's number of 22 seconds. The IPA bubble point was 243 kPa. The mean flow pore diameter was 0.069 µm.

Example 18

A fluororesin thin film fixed on an aluminum foil was formed in a manner similar to that in Example 12 except that the fluororesin dispersion was changed to a fluororesin dispersion which was prepared using PTFE dispersion AD911 and the MFA latex to have a MFA/(PTFE+MFA) (volume ratio of solid component of fluororesin) of 17.5%. (The average thickness of the fluororesin thin film calculated from the difference in weight of the aluminum foil per unit area before and after the fluororesin thin was formed and the absolute specific gravity thereof (2.25 g/cm$^3$) was approximately 3 μm.)

In addition, by using this fluororesin thin film fixed on the aluminum foil, a composite was obtained in a manner similar to that in Example 12 in which the fluororesin thin film composed of the mixture of PTFE and MFA was adhered onto a stretched PTFE porous member by MFA and in which the aluminum foil was fixed on the fluororesin thin film. Next, the aluminum foil was removed by dissolution using hydrochloric acid, so that a test sample was obtained.

The Gurley's number of this test sample was 5,000 seconds or more, and when isopropyl alcohol was brought into contact with the test sample at the fluororesin thin film side at room temperature, no pores which allowed IPA to permeate therethrough were present; hence, it was shown that a fluororesin composite including a fluororesin thin film which allowed no IPA to permeate therethrough was obtained.

Next, after the test sample was stretched in a width direction using a tensile testing device under the conditions in which the temperature was 60° C., the initial distance between chucks was 55 mm, and the stroke was 165 mm (elongation rate of 200%), the test sample was further stretched in a direction perpendicular to the width direction using the same tensile testing device as described above under the conditions in which the temperature was 60° C., the initial distance between chucks was 55 mm, and the stroke was 88 mm (elongation rate of 60%). The stretched porous fluororesin composite had a Gurley's number of 22 seconds. The IPA bubble point was 214 kPa. The mean flow pore diameter was 0.070 μm.

The results of Examples 10 to 18, that is, the volume ratio of PTFE in the resin, the Gurley's number, the IPA bubble point, and the mean flow pore diameter, are shown in Table III.

TABLE III

| Example No. | Volume ratio of PTFE in resin (%) | Gurley's number | IPA bubble point (kPa) | Mean flow pore diameter (μm) |
| --- | --- | --- | --- | --- |
| 10 | 96.0 | 25 | 660 | 0.047 |
| 15 | 90.0 | 29 | 426 | 0.062 |
| 16 | 87.5 | 22 | 261 | 0.06 |
| 17 | 85.0 | 22 | 243 | 0.069 |
| 18 | 82.5 | 22 | 214 | 0.07 |
| 12 | 80.0 | 19 | 148 | 0.13 |
| 13 | 60.0 | 38 | 277 | 0.071 |
| 14 | 40.0 | 20 | 23 | 0.077 |
| 11 | 0.0 | 21 | 14 | 0.098 |

From the results shown in Table III, it may be said that the porous fluororesin composites obtained in Examples 10 to 18 each have a usable Gurley's number, IPA bubble point, and mean flow pore diameter as a filter. However, when the volume ratio of PTFE is less than 80%, the IPA bubble point is low in many cases; hence, in order to stably obtain a high flow-rate separation membrane having a high IPA bubble point and a small mean flow pore diameter, the volume ratio of PTFE is preferably 80% or more and more preferably 90% or more.

Figure 1:
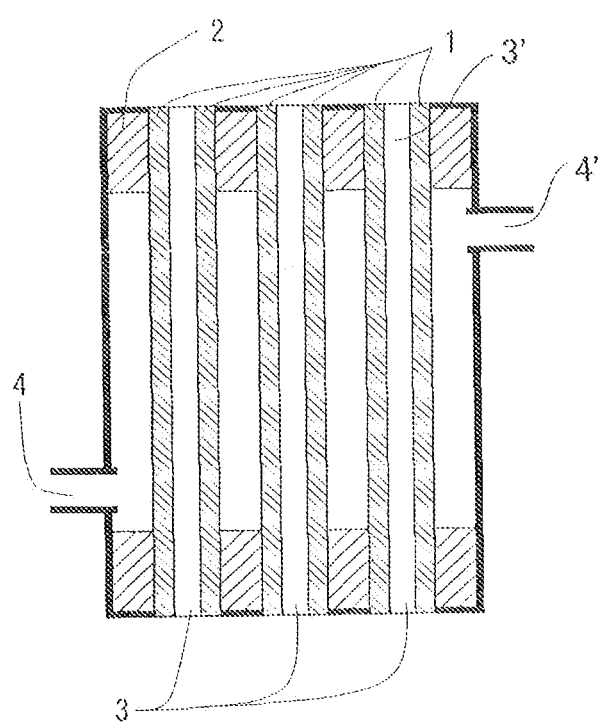
FIG. 1 is a schematic cross-sectional view illustrating one example of a separation membrane element of the present invention.
Figure 2:
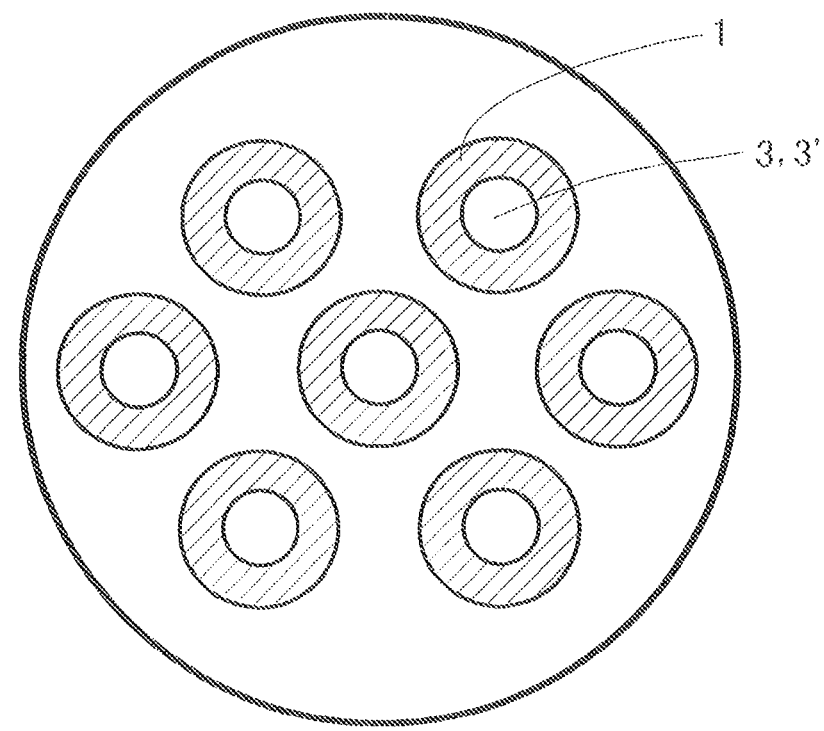
FIG. 2 is a schematic cross-sectional view illustrating one example of the separation membrane element of the present invention.
Figure 3:
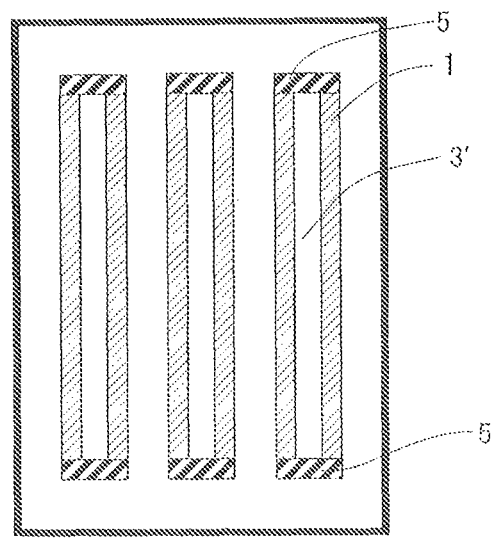
FIG. 3 is a schematic cross-sectional view illustrating another example of the separation membrane element of the present invention.
Figure 4:
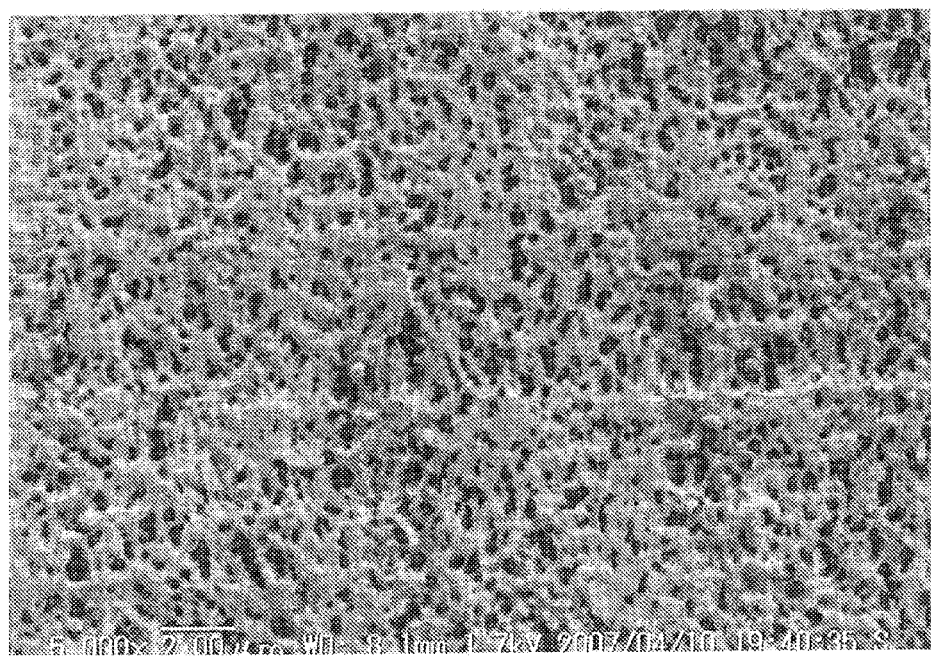
FIG. 4 is an electron microscope photograph of a porous fluororesin composite obtained in Example 10.
Figure 5:
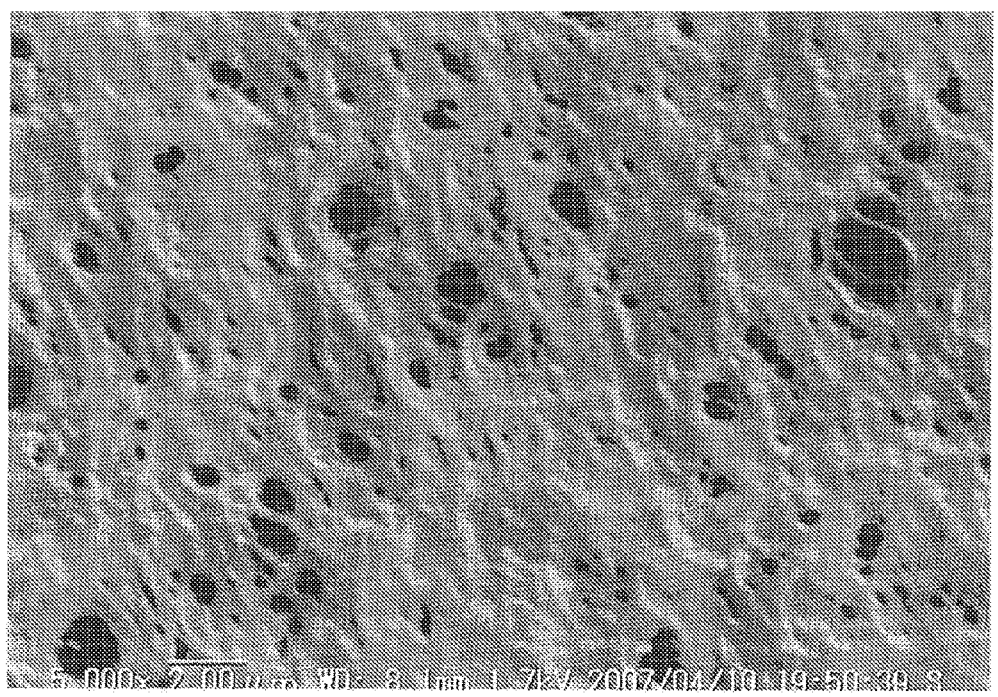
FIG. 5 is an electron microscope photograph of a porous fluororesin composite obtained in Example 11.
Figure 6:
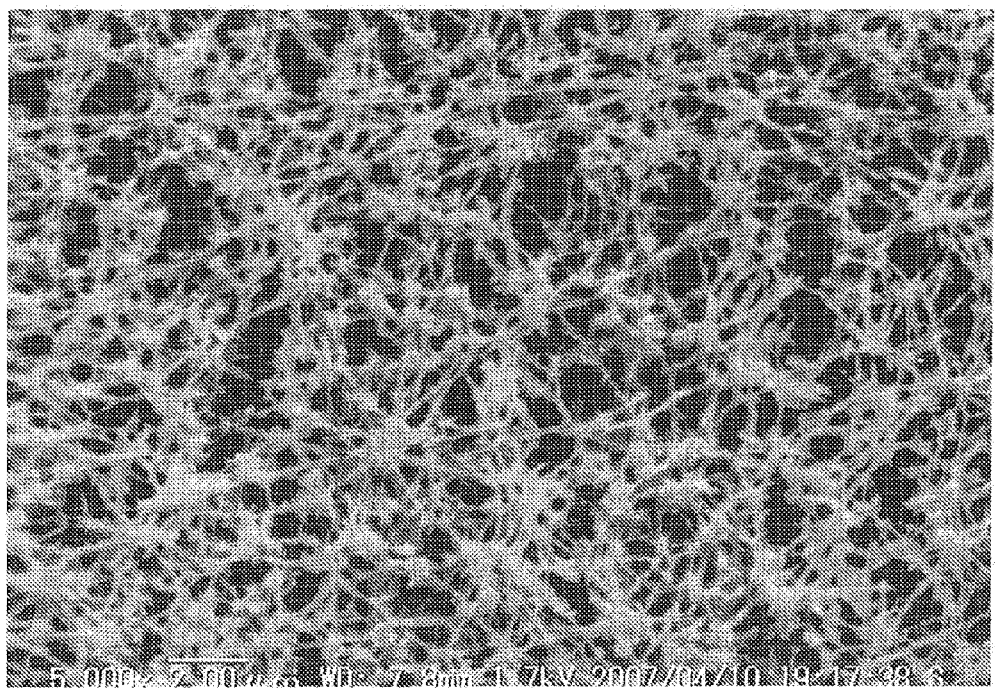
FIG. 6 is an electron microscope photograph of a filter of Reference Example 7.

REFERENCE NUMERALS 1 porous fluororesin film
2 fixing portion
3 inlet of process liquid
3' outlet of process liquid
4 inlet of processed liquid
4' outlet of processed liquid
5 sealing tool

The invention claimed is:

1. A method for manufacturing a porous fluororesin composite, comprising the steps of:
applying a fluororesin dispersion including a dispersing medium and a fluororesin powder dispersed therein between a flat foil and a porous base material; then drying the dispersing medium and sintering the fluororesin powder at a temperature of the melting point of the fluororesin or more; then removing the flat foil to form a fluororesin composite composed of the porous base material and a fluororesin thin film formed on one surface of the porous base material; and then stretching the fluororesin composite,
wherein the thickness of the fluororesin thin film is 20 μm or less and the Gurley's number thereof is 300 seconds or more.

2. A method for manufacturing a porous fluororesin composite, comprising the steps of:
applying a fluororesin dispersion including a dispersing medium and a fluororesin powder dispersed therein on a flat foil; then drying the dispersing medium and sintering the fluororesin powder at a temperature of the melting point of the fluororesin or more to form a fluororesin thin film; after the fluororesin thin film is formed, adhering the fluororesin thin film to a porous base material; then removing the flat foil to form a fluororesin composite composed of the porous base material and a fluororesin thin film formed on one surface of the porous base material; and then stretching the fluororesin composite,
wherein the thickness of the fluororesin thin film is 20 μm or less and the Gurley's number thereof is 300 seconds or more.

3. The method for manufacturing a porous fluororesin composite according to claim 1, further comprising, after the step of removing the flat foil and before the step of stretching the fluororesin composite, the step of adhering the fluororesin composite to another porous base material in such a way that the fluororesin thin film is provided between the porous base materials.

4. The method for manufacturing a porous fluororesin composite according to claim 2, further comprising, after the step of removing the flat foil and before the step of stretching the fluororesin composite, the step of adhering the fluororesin composite to another porous base material in such a way that the fluororesin thin film is provided between the porous base materials.

* * * * *